United States Patent
Chen (10) Patent No.: US 10,065,802 B1
(45) Date of Patent: Sep. 4, 2018

(54) MODULAR CONVEYOR BELT INTEGRATING A HIGH DENSITY ARRAY OF ROLLERS

(71) Applicant: Laitram, L.L.C., Harahan, LA (US)

(72) Inventor: Sijia Chen, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/488,717

(22) Filed: Apr. 17, 2017

(51) Int. Cl.
*B65G 17/40* (2006.01)
*B65G 39/20* (2006.01)
*B65G 17/08* (2006.01)

(52) U.S. Cl.
CPC ............. *B65G 17/40* (2013.01); *B65G 17/08* (2013.01); *B65G 39/20* (2013.01)

(58) Field of Classification Search
CPC .... B65G 17/08; B65G 17/083; B65G 17/086; B65G 17/24; B65G 17/40; B65G 39/20
See application file for complete search history.

(56) References Cited

U.S. PATENT DOCUMENTS

| | | | |
|---|---|---|---|
| 4,213,527 A * | 7/1980 | Lapeyre | B26D 1/00 198/853 |
| 4,231,469 A * | 11/1980 | Arscott | B65G 17/06 193/35 F |
| 4,909,380 A | 3/1990 | Hodlewsky | |
| 5,224,583 A | 7/1993 | Palmaer et al. | |
| 5,261,525 A | 11/1993 | Garbagnati | |
| 5,413,211 A * | 5/1995 | Faulkner | B65G 17/08 198/690.2 |
| 6,079,543 A * | 6/2000 | Palmaer | B65G 17/08 198/445 |
| 6,148,990 A | 11/2000 | Lapeyre et al. | |
| 6,209,714 B1 | 4/2001 | Lapeyre et al. | |
| 6,364,095 B1 | 4/2002 | Layne et al. | |
| 6,382,404 B1 * | 5/2002 | Guldenfels | B65G 17/08 198/699.1 |
| 6,398,015 B1 | 6/2002 | Sedlacek et al. | |
| 6,585,110 B2 * | 7/2003 | Layne | B65G 17/08 198/838 |

(Continued)

FOREIGN PATENT DOCUMENTS

| | | |
|---|---|---|
| JP | 2003012134 A | 1/2003 |
| JP | 2006044875 A | 2/2006 |

OTHER PUBLICATIONS

INTRALOX Modular Plastic Conveyor Belts Engineering Manual excerpt, pp. 1, 144, (Series 1000 Insert Roller), copyright 2011, Intralox, L.L.C., Harahan, Louisiana, U.S.A.

(Continued)

*Primary Examiner* — Gene O Crawford
*Assistant Examiner* — Keith Campbell
(74) *Attorney, Agent, or Firm* — Catherine M. Bishop (57) ABSTRACT

A conveyor belt module for inserting a high-density array of rollers comprises a bottom heavy spine forming a portion of a module body and gusset blocks reinforcing an intersection between the spine and hinge elements. The conveyor belt module includes hinge elements spaced apart by five different separation distances to allow a high-density array of rollers mounted on a hinge rod in spaces formed between the hinge elements and interlaced hinge elements of an adjacent conveyor belt module in a modular plastic conveyor belt formed by a plurality of interlaced conveyor belt modules.

24 Claims, 8 Drawing Sheets

(56) References Cited

U.S. PATENT DOCUMENTS

| | | | |
|---|---|---|---|
| 6,758,329 B1* | 7/2004 | Damkjaer | B65G 17/08 |
| | | | 198/850 |
| 6,932,211 B2 | 8/2005 | Wieting et al. | |
| 7,527,146 B2 | 5/2009 | Stebnicki et al. | |
| 7,540,368 B2 | 6/2009 | Weiser | |
| 7,578,384 B2 | 8/2009 | Fandella | |
| 7,891,481 B2* | 2/2011 | Pressler | B65G 17/24 |
| | | | 198/779 |
| 8,776,998 B2* | 7/2014 | Weiser | B65G 17/08 |
| | | | 198/850 |
| 9,663,298 B2* | 5/2017 | MacLachlan | B65G 17/08 |
| 2003/0192777 A1 | 10/2003 | Guldenfels | |
| 2011/0073444 A1 | 3/2011 | Wunsch | |

OTHER PUBLICATIONS

International Search Report and Written Opinion of the International Searching Authority, PCT/US2018/025825, dated Jul. 23, 2018, Korean Intellectual Property Office.

* cited by examiner

MODULAR CONVEYOR BELT INTEGRATING A HIGH DENSITY ARRAY OF ROLLERS

BACKGROUND

The invention relates generally to power-driven conveyors and more particularly to modular plastic conveyor belts.

Modular plastic conveyor belts are widely used in various industries to convey products. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

In addition, some conveyor belts integrate rollers or other auxiliary components using rods. For example, the INTRALOX® Insert Roller belts include a plurality of rollers protruding above and below the top and bottom surfaces of the belt and mounted on hinge rods. The insert rollers may be used for lower back pressure accumulation or other applications. The INTRALOX® Series 7050 Dual-Stacked Transverse Roller belt includes a first set of rollers within the body of a conveyor belt module supporting a second set of smaller-diameter rollers that contact and direct product. The addition of rollers can add significant weight and strain to the conveyor belt and potentially weaken the conveyor belt.

SUMMARY

A modular plastic conveyor belt integrating rollers comprises a conveyor belt module having a module body and a plurality of hinge elements configured to allow a high density array of rollers mounted on a hinge rod linking two successive modules. A conveyor belt module has a bottom heavy spine forming at least a portion of the module body and gusset blocks formed at selected intersections between hinge elements and the spine. An array of rollers is mounted on a hinge rod in spaces formed between interlaced hinge elements of hingedly connected conveyor belt modules.

According to one aspect, a conveyor belt module comprises a module body comprising a bottom heavy, laterally-extending spine having a top surface, a bottom surface, a front surface and a rear surface, and hinge elements.

According to another aspect, a conveyor belt module comprises a module body extending in thickness from a top surface to a bottom surface and longitudinally from a front surface to a rear surface, a first hinge element extending longitudinally forward from the front surface, a second hinge element extending longitudinally rearward from the rear surface and a first gusset block formed at an intersection between the module body and the first hinge element.

According to another aspect, conveyor belt comprises a first module, a second module hingedly connected to the first module via a hinge rod and a plurality of rollers mounted on the hinge rod in spaces formed between a fourth set of hinge elements and a first set of hinge elements. The plurality of rollers comprising a first side roller adjacent to a first side of the module bodies, a first set of evenly spaced rollers spaced from the first side roller by a first separation distance, a second set of evenly spaced rollers spaced from the first set of evenly spaced rollers by the first separation distance, a third set of evenly spaced rollers spaced from the second set of evenly spaced rollers by the first separation distance and a second side roller adjacent to a second side of the module bodies and separated from the third set of evenly spaced rollers by the first separation distance.

According to still another aspect, a conveyor belt module comprises a module body extending in thickness from a top surface to a bottom surface and longitudinally in a direction of belt travel from a first end to a second end, a first hinge element extending forward from the first end, a second hinge element extending forward from the first end and spaced from the first hinge element by a first distance, a third hinge element extending forward from the first end and spaced from the first hinge element by a second distance that is smaller than the first distance, a fourth hinge element extending forward from the first end and separated from the first hinge element by a third distance that is smaller than the second distance, a fifth hinge element extending rearward from the second end, a sixth hinge element extending rearward from the second end and spaced from the fifth hinge element by a fourth separation distance that is larger than the first separation distance, a seventh hinge element extending rearward from the second end, the seventh hinge element spaced from the fifth hinge element by the first separation distance and an eighth hinge element extending rearward from module body and separated from the seventh hinge element by a fifth separation distance that is between the second separation distance and the third separation distance.

According to still another aspect, a conveyor belt module comprises a module body having a top surface, a bottom surface, a front surface and a rear surface, a first element extending forward from the front surface and a second hinge element spaced apart from the first hinge element by a first space and extending forward from the front surface. The first space is asymmetrical about a line extending halfway between the first hinge element and the second hinge element, the asymmetry caused by a feature extending between the first hinge element and the module body.

BRIEF DESCRIPTION OF THE DRAWINGS

These aspects and features of the invention, as well as its advantages, are described in more detail in the following description, appended claims, and accompanying drawings, in which:

DETAILED DESCRIPTION

A modular plastic conveyor belt may integrate a high density array of rollers using a bottom heavy spine in a conveyor belt module and-or gusset blocks between hinge elements and the spine. The invention will be described relative to certain illustrative embodiments, though one skilled in the art will recognize that the invention is not limited to these illustrative embodiments.

Figure 1:
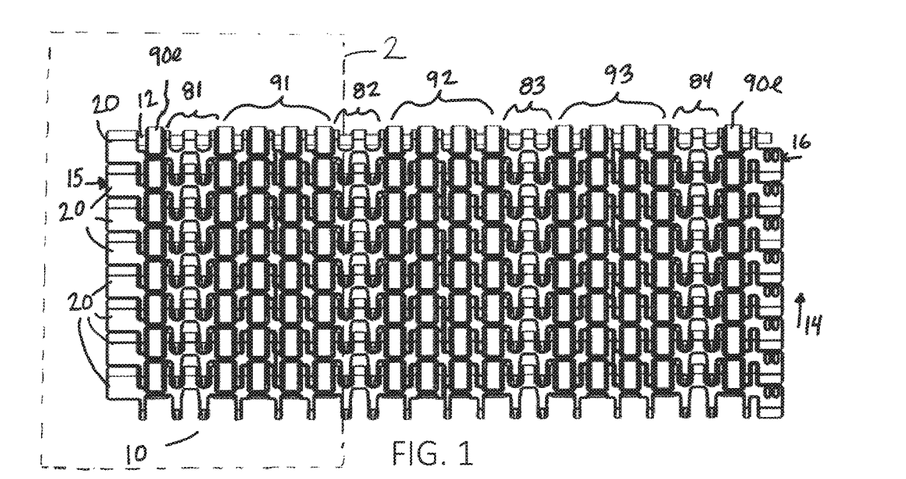
FIG. 1 is a top view of a portion of a modular plastic conveyor belt integrating rollers according to an embodiment of the invention.

A portion of a conveyor belt comprising linked modules and having features of the invention is shown in FIG. 1. The conveyor belt 10 extends longitudinally in a direction of belt travel 14, laterally from a first side 15 to a second side 16 and from a top conveying surface to an opposite bottom surface (not shown). The conveyor belt 10 comprises a plurality of hingedly connected modules 20 with rollers 90 inserted between successive rows of modules. Adjacent modules are connected using hinge rods 12 inserted through a hinge passageway formed in interlaced hinged elements extending from each end of the modules. The illustrative conveyor belt is a "high density roller belt", comprising rollers 90 mounted on the hinge rods 12 in spaces between successive modules. Each illustrative row in the conveyor belt 10 comprises fourteen (14) rollers inserted between the first side 15 and the second side 16 of the conveyor belt.

Figure 2:
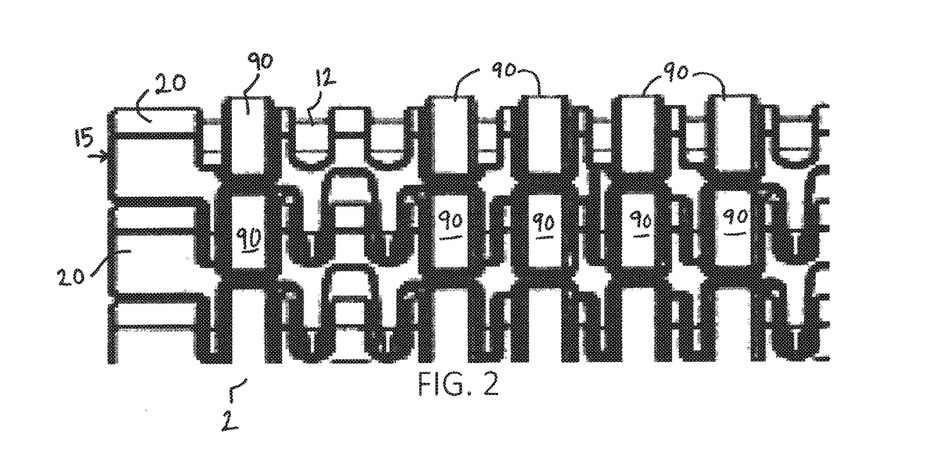
FIG. 2 is a close-up view of region 2 in FIG. 1.

The illustrative pattern of rollers comprises a first side roller 90e adjacent a first side 15 of the module, a first non-roller portion 81 where no rollers are inserted, a first roller portion 91 comprising four evenly spaced rollers 90, a second non-roller portion 82, a second roller portion 92 comprising four evenly spaced rollers 90 in the lateral center of the belt, a third non-roller portion 83, a third roller portion 93 and another non-roller portion 84 adjacent to a second side roller 90e, which is in turn adjacent to the second side 16 of the module. FIG. 2 is a detailed view of a portion 2 of the conveyor belt of FIG. 1. The non-roller portions 81, 82, 83 and 84 have the same width to create an equal separation distance between each of the roller portions 90e, 91, 92, 93 and 90e. Within the roller portions 91, 92, 93, the rollers 90 are evenly spaced.

Figure 3:
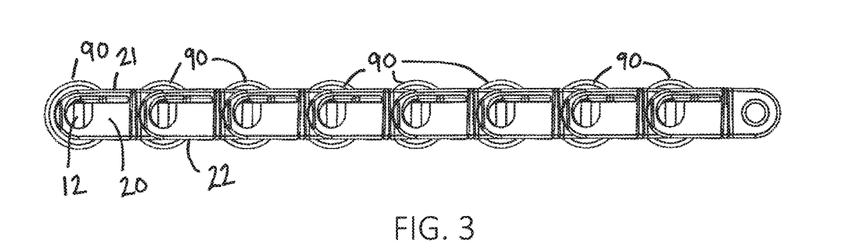
FIG. 3 is a side view of the portion of the modular plastic conveyor belt of FIG. 1.
Figure 4:
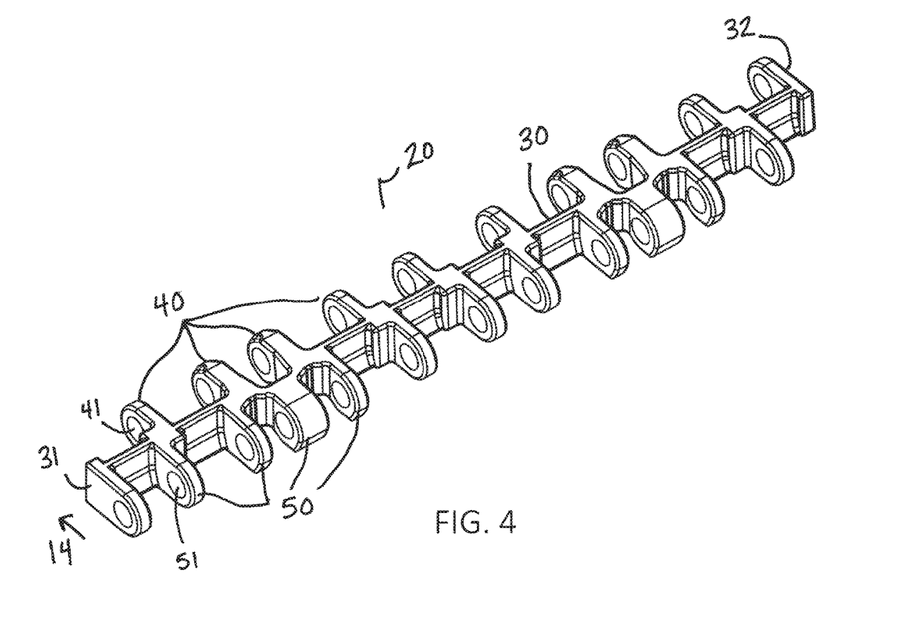
FIG. 4 is an isometric top view of a conveyor belt module according to an embodiment of the invention.
Figure 5:
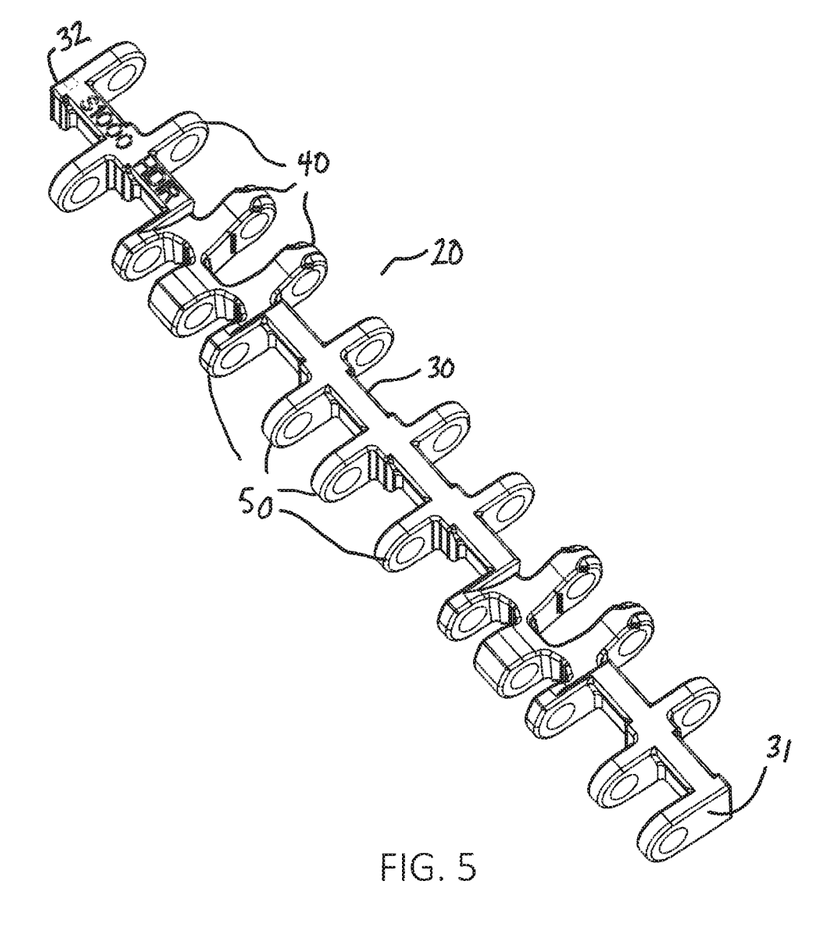
FIG. 5 is an isometric bottom view of the conveyor belt module of FIG. 4.

As shown in FIG. 3, each inserted roller 90 can extend above the top surface 21 of the modules as well as below the bottom surface 22 of the modules 20.

Referring to FIGS. 4-7, a conveyor belt module 20 suitable for forming a conveyor belt 10 with a high density array of inserted rollers 90 comprises a central module body 30 extending along a lateral axis from a first side 31 to a second side 32 from which two sets of offset hinge elements 40, 50 extend opposite and offset from each other in the longitudinal direction 14. Each hinge element includes a hinge opening 41, 51 aligned with other hinge openings in the set to form a hinge passageway.

Figure 6:
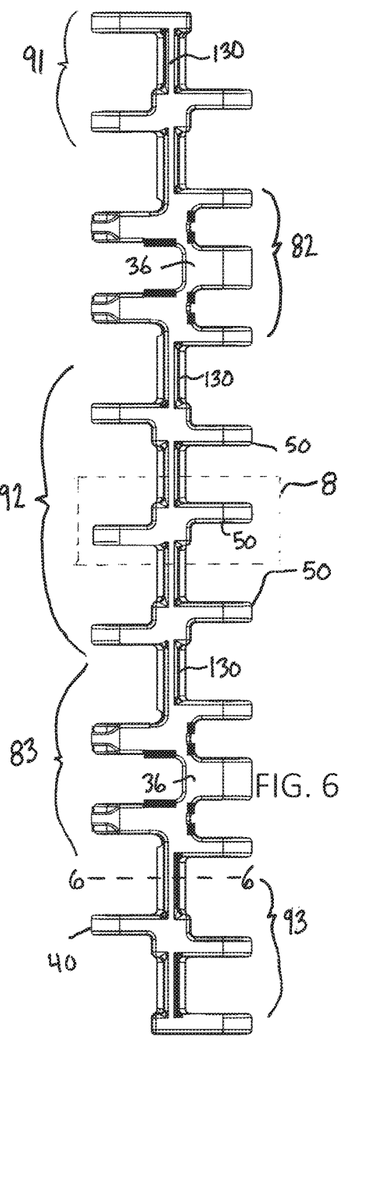
FIG. 6 is a top view of the conveyor belt module of FIG. 4.
Figure 7:
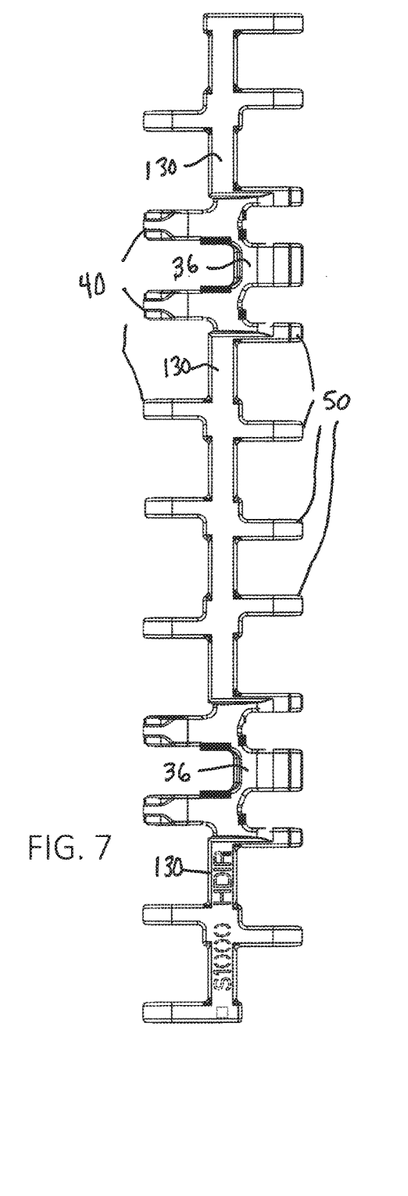
FIG. 7 is a bottom view of the conveyor belt module of FIG. 4.

As shown in FIG. 6, in a roller portion 91, 92 or 93 of the module 20, the central module body 30 comprises a laterally-extending spine 130 from which hinge elements 40, 50 extend in both longitudinal directions. Rollers can be inserted in the spaces formed between adjacent hinge elements 40, 50 in successive modules. The hinge elements are spaced apart to allow insertion of a roller when hinge elements of successive modules interlace. In the non-roller portions 81, 82, 83 or 84, the module body comprises a corrugated portion 36 from which hinge elements 40, 50 extend in both directions. No rollers are inserted between hinge elements in these portions.

Figure 8:
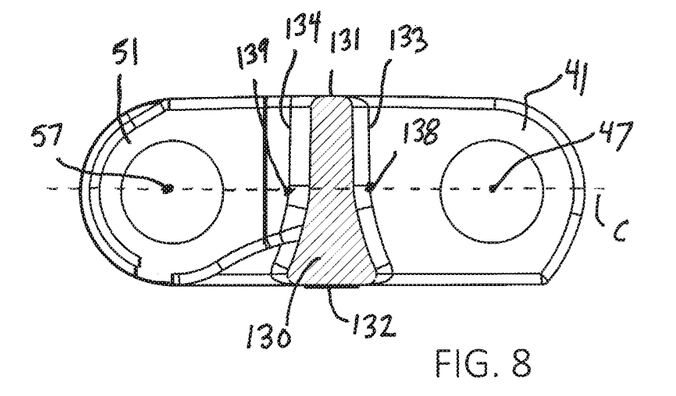
FIG. 8 is a cross-sectional view of the conveyor belt module of FIG. 6 through line 6-6, showing the shape of the spine.
Figure 9:
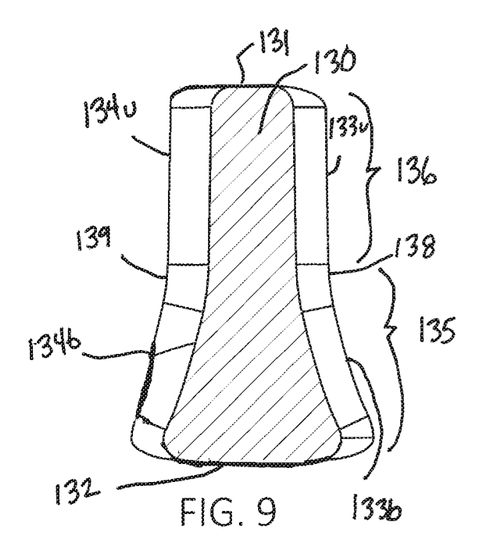
FIG. 9 is a detailed view of the spine of the conveyor belt module of FIG. 8.

In one embodiment, the spine 130 is bottom heavy. For example, as shown in FIGS. 8 and 9, the illustrative spine 130 extends in thickness from a top conveying surface 131 to an opposite bottom surface 132. The spine extends longitudinally from a front surface 133 to a rear surface 134. As shown in FIGS. 8 and 9, the illustrative spine is bottom-heavy, i.e., the bottom portion 135 of the spine, is thicker than the top portion 136. The spine may have any suitable configuration. For example, the illustrative spine 130 flares outward towards the bottom surface 132 and tapers towards the top conveying surface 131, so the top conveying surface 131 is shorter in the longitudinal direction than the bottom surface 132. However, the invention is not limited to this embodiment.

In one embodiment, the spine 130 may be considered bell-bottomed, with the top portion 136 having a substantially consistent thickness and the bottom portion 135 flaring out. In the embodiment shown in FIGS. 8 and 9, the tops 133u, 134u of the front and rear surfaces of the spine 130 are substantially straight and vertical. At an inflection point 138, 139, the front and rear surfaces 133, 134 inflect to flare out forming a slightly concave curve in the lower sections 133b, 134b. The illustrative inflection points 138, 139 coincide with the vertical center C of the module. In the illustrative embodiment, the inflection points 138, 139 align with the centers 47, 57 of the hinge openings, which are also vertically centered in the module 30.

Figure 10:
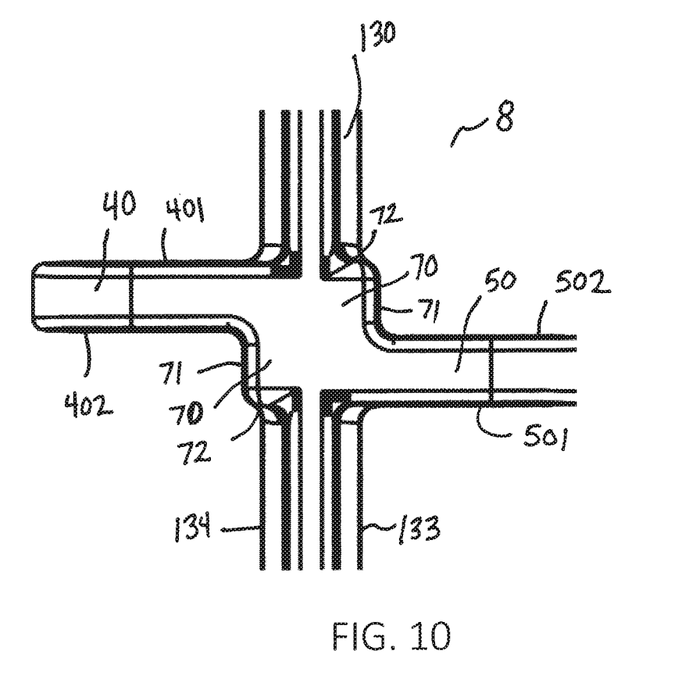
FIG. 10 is a close-up view of region 8 in FIG. 6

In addition to the shaped spine 130 in roller portions of the module 20, the module 20 further includes support structure for the module body 30. As shown in FIG. 10, the module 20 may include a gusset block 70 at an intersection between a hinge element 40, 50 and the module body, shown as the spine portion 130. Each gusset block 70 includes an outward surface 71 parallel to the lateral axis of the module body 30. The outward surface 71 intersects the side of a hinge element 50 or 40 at a right angle. Each gusset block 70 further includes a side surface 72 that aligns with a side wall 401 or 501 of an opposite hinge element, so that the gusset block almost appears an extension of the opposite hinge element. The other hinge element side walls 402, 502 are slightly offset from each other. The illustrative surfaces 71 and 72 are substantially vertical and intersect at a right angle to form a block structure. The illustrative outer surfaces 71 of the gusset blocks 70 are longitudinally outwards of the outermost portions of front and rear surfaces 133, 134 of the spine 130, i.e., the surfaces 71 are farther away from center of spine 130 than the flared-out portions of the surfaces 133 and 134.

Figure 11:
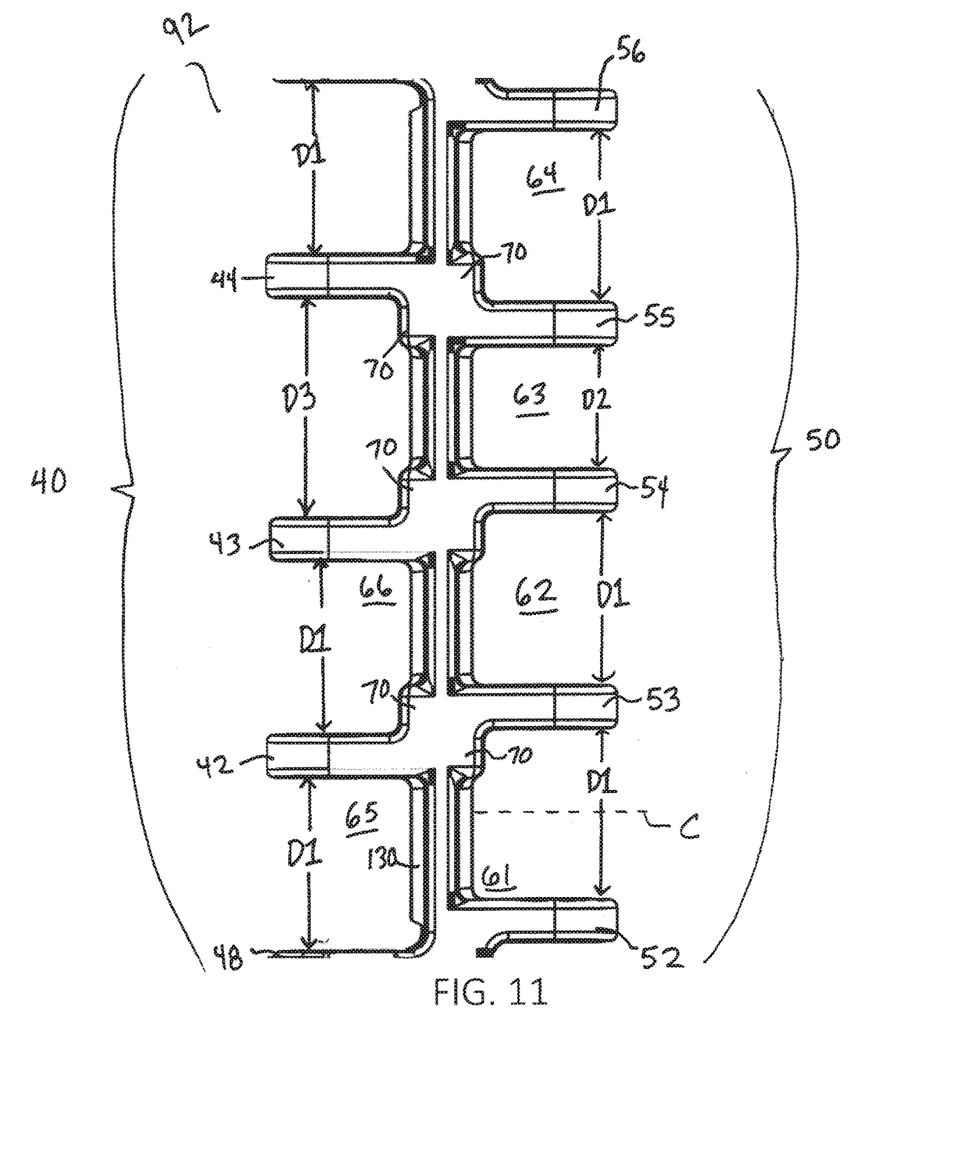
FIG. 11 is a close-up view of region 92 in FIG. 6.

Referring to FIG. 11, which shows a close-up view of a roller portion region 92 of a module, the gusset blocks 70 create asymmetric spaces between some of the hinge elements in the roller section of the module. For example, a first space 61 between a first hinge element 52 and a second hinge element 53 in the second set 50 includes a gusset block 70 between the hinge element 53 and the spine 130. The first hinge element 52 and the second hinge element 53 are separated by a distance of D1. Traditionally, the space between hinge elements is symmetric about a central longitudinal axis C bisecting the space. However, the gusset block 70 buttressing the intersection between the hinge element 53 and spine 130 creates a space 61 that is asymmetric about the central longitudinal axis C.

The conveyor belt module 20 has five different separation distances separating adjacent hinge elements in the module.

Second hinge element 53 and third hinge element 54 are also separated by a distance D1, with the gusset block 70 extending between third hinge element 54 and spine 130 creating a second space 62 that is asymmetric about a central longitudinal axis.

Fourth hinge element 55 is separated from the third hinge element 54 by a distance D2 that is smaller than D1. The third space 63 between hinge elements 55 and 54 does not include a gusset block and is symmetric about a central longitudinal axis.

Fifth hinge element 56 and fourth hinge element 55 are also separated by a distance D1, with the gusset block 70 extending between fourth hinge element 53 and spine 130 creating a fourth space 64 that is asymmetric about a central longitudinal axis.

On the other longitudinal end of the spine 130, some of the hinge elements 40 also include gusset blocks 70. A first hinge element 42 within the roller portion 92 is separated from an adjacent hinge element 48 in the non-roller portion of the module by distance D1. No gusset blocks extend into the space 65 between hinge elements 42 and 48.

Hinge elements 42 and 43 are also separated by distance D1, with gusset block 70 at the intersection of hinge element 42 and the spine 130 creating asymmetry within the resulting space 66.

Hinge elements 43 and 44 are separated by a larger distance D3. Because gusset blocks extend into the space 67 between hinge elements 43 and 44 at both ends, the space 67 is symmetric about a central longitudinal axis.

Thus, in the roller portion of the module, there are three different separation distances between adjacent hinge elements. D2 is smaller than D1 by approximately the lateral width of gusset wall 71. D3 is larger than D1 by approximately the lateral width of the gusset wall 71 or the width of a hinge element.

In one embodiment, each hinge element within a roller portion has a gusset block on at least one side at the intersection between the hinge element and the spine.

Figure 12:
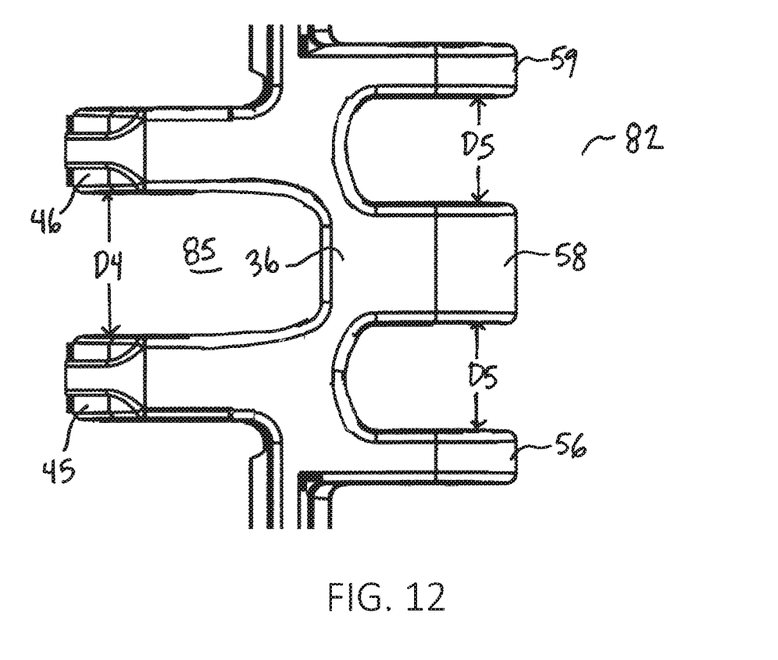
FIG. 12 is a close-up view of region 82 in FIG. 6.

In a non-roller section, as previously described, the module body 30 comprises a corrugated portion 36. FIG. 12 shows a non-roller section 82 of the module of an embodiment of the invention. On a first end, hinge elements 45 and 46 in the first set of hinge elements extend longitudinally from the corrugated portion 36. The hinge elements 45 and 46 are separated by a separation distance D4 that is smaller than D1, D2 and D3 in the roller portions of the module. The non-roller portion 82 of the module lacks gusset blocks, so the space 85 between adjacent hinge elements 45 and 46 is symmetric about a central longitudinal axis. On the second end of the corrugated portion 36, hinge elements 56, 58 and 59 extend longitudinally and interlace with hinge elements 45 and 46 of an adjacent module. Hinge elements 56 and 59 also form the boundary between the non-roller portion and roller portions of the module. The central hinge element 58 is thicker than the side hinge elements 56 and 59 and is opposite the space 85. The hinge elements 56, 58 and 59 are evenly spaced apart, separated by a separation distance D5 that is smaller than D1, D2, D3 and D4. Thus, the first set of hinge elements 40 has three different separation distances (D1, D3 and D4) and the second set of hinge elements 50 has three different separation distances (D1, D2 and D5), two of which are different from the separation distances in the first set of hinge elements 40.

Although the invention has been described in detail with respect to an exemplary version, other versions are possible. So, as these few examples suggest, the scope of the claims is not meant to be limited to the exemplary embodiments described in detail.

What is claimed is:
1. A conveyor belt module comprising:
    a module body comprising a laterally-extending spine having a top surface forming part of a top conveying surface, an opposite bottom surface, a front surface and a rear surface, wherein the laterally-extending spine is bottom heavy, with a bottom portion of the spine thicker in a longitudinal direction than a top portion;
    a first set of hinge elements spaced apart across first gaps and extending longitudinally forward from the front surface; and
    a second set of hinge elements spaced apart across second gaps and extending longitudinally rearward from the rear surface.
2. The conveyor belt module of claim 1, wherein the spine has a top portion having a substantially consistent thickness and a bottom portion that flares out.
3. The conveyor belt module of claim 1, wherein the front surface has a substantially straight upper portion that transitions at an inflection point to a concave curve in a lower portion.
4. The conveyor belt module of claim 3, wherein the rear surface has a substantially straight upper portion that transitions at an inflection point to a concave curve in a lower portion.
5. The conveyor belt modules of claim 3, wherein the inflection point is centered between the top surface and the bottom surface.
6. The conveyor belt module of claim 1, further comprising a gusset block at an intersection between a first hinge element and the spine.
7. The conveyor belt module of claim 1, wherein the module body further comprises a corrugated portion in a non-roller region.
8. The conveyor belt module of claim 1, wherein the first set of hinge elements have three different separation distances and the second set of hinge elements have three different separation distance, at least one separation distance in the first set of hinge elements different from the separation distances in the second set of hinge elements.
9. The conveyor belt module of claim 3, wherein the inflection point aligns with vertical centers of the hinge elements.
10. A conveyor belt module comprising:
    a module body extending in thickness from a top surface forming part of a conveying surface to an opposite bottom surface and longitudinally from a front surface to a rear surface;
    a first hinge element extending longitudinally forward from the front surface;
    a second hinge element extending longitudinally rearward from the rear surface and offset laterally from the first hinge element; and
    a first gusset block for the module body formed at an intersection between the module body and the first hinge element, the gusset block having a longitudinally outward surface that intersects a side surface of the first hinge element and a side surface that intersects the front surface of the module body, the top surface of the gusset block, module body and hinge elements all in same plane to form the conveying surface.
11. The conveyor belt module of claim 10, further comprising a second gusset block formed at an intersection between the module body and the second hinge element.
12. The conveyor belt module of claim 10, wherein the longitudinally outward surface is vertical and perpendicular to a longitudinal direction and the side surface is vertical and parallel to the longitudinal direction.

13. The conveyor belt module of claim 12, wherein the vertical outward surface extends beyond the front surface.

14. The conveyor belt module of claim 12, wherein the vertical side surface aligns with a side surface of the second hinge element.

15. The conveyor belt module of claim 10, wherein the module body comprises a laterally-extending spine that is bottom heavy.

16. A conveyor belt comprising:
a first module comprising a module body, a first set of hinge elements extending in a first direction from a first end of the module body and a second set of hinge elements extending in a second direction from a second end of the module body;
a second module hingedly connected to the first module, the second module comprising a module body, a third set of hinge elements extending in the first direction from a first end of the module body and a fourth set of hinge elements extending in the second direction from a second end of the module body, the fourth set of hinge elements interlaced with the first set of hinge elements to form a hinge passageway;
a hinge rod inserted in the hinge passageway to hingedly connect the first module to the second module; and
a plurality of rollers mounted on the hinge rod in spaces formed between the fourth set of hinge elements and the first set of hinge elements, the plurality of rollers comprising a first side roller adjacent to a first side of the module bodies, a first set of evenly spaced rollers spaced from the first side roller by a first separation distance, a second set of evenly spaced rollers spaced from the first set of evenly spaced rollers by the first separation distance, a third set of evenly spaced rollers spaced from the second set of evenly spaced rollers by the first separation distance and a second side roller adjacent to a second side of the module bodies and separated from the third set of evenly spaced rollers by the first separation distance, wherein each of the first set of evenly spaced rollers, the second set of evenly spaced rollers and the third set of evenly spaced rollers comprises a plurality of rollers separated from each other by a second separation distance that is smaller than the first separation distance.

17. The conveyor belt of claim 16, wherein each module body comprises a laterally-extending spine that is bottom heavy.

18. The conveyor belt of claim 16, further comprising a plurality of gusset blocks at selected intersections between a hinge element and the module body.

19. A conveyor belt module comprising:
a module body extending in thickness from a top surface to a bottom surface and longitudinally in a direction of belt travel from a first end to a second end;
a first hinge element extending forward from the first end;
a second hinge element extending forward from the first end and spaced from the first hinge element by a first space that laterally spans a first distance;
a third hinge element extending forward from the first end and spaced from the second hinge element by a second space that laterally spans a second distance that is smaller than the first distance, the second hinge element between the first hinge element and third hinge element;
a fourth hinge element extending forward from the first end and separated from the first hinge element by a third space that laterally spans a third distance that is smaller than the second distance;
a fifth hinge element extending rearward from the second end;
a sixth hinge element extending rearward from the second end and spaced from the fifth hinge element by a fourth space that laterally spans a fourth separation distance that is larger than the first separation distance;
a seventh hinge element extending rearward from the second end, the seventh hinge element spaced from the fifth hinge element by a fifth space having a lateral width equal to the first separation distance; and
an eighth hinge element extending rearward from module body and separated from the seventh hinge element by a sixth space that laterally spans a fifth separation distance that is between the second separation distance and the third separation distance.

20. The conveyor belt module of claim 19, wherein the module body is bottom heavy.

21. The conveyor belt module of claim 19, further comprising a plurality of gusset blocks at selected intersections between the second, third, fifth or sixth hinge element and the module body.

22. A conveyor belt module comprising:
a module body having a top surface, a bottom surface, a front surface and a rear surface,
a first element extending forward from the front surface;
a second hinge element spaced apart from the first hinge element by a first space and extending forward from the front surface, the first space being asymmetrical about a line extending halfway between the first hinge element and the second hinge element, the asymmetry caused by a gusset block having a longitudinally outward surface intersecting the first hinge element and a side surface that intersects the front surface of the module body.

23. The conveyor belt module of claim 22, wherein the module body is bottom heavy.

24. A conveyor belt module comprising:
a module body comprising a laterally-extending spine having a top conveying surface, an opposite bottom surface, a front surface having an upper portion that is substantially vertical and straight, wherein the front surface inflects at a front inflection point to flare out in a bottom portion, and a rear surface having an upper portion that is substantially vertical and straight, wherein the rear surface inflect at a rear inflection point to flare out in the bottom portion,
a first set of hinge elements spaced apart across first gaps and extending forward from the front surface; and
a second set of hinge elements spaced apart across second gaps and extending rearward from the rear surface, wherein the front and rear inflection points align with vertical centers of the hinge elements.

\* \* \* \* \*